US008029131B2

(12) United States Patent
Assia

(10) Patent No.: US 8,029,131 B2
(45) Date of Patent: Oct. 4, 2011

(54) INVERTIBLE EYEWEAR

(76) Inventor: Ronen Assia, Savion (IL)

( * ) Notice: Subject to any disclaimer, the term of this patent is extended or adjusted under 35 U.S.C. 154(b) by 0 days.

(21) Appl. No.: 12/162,496

(22) PCT Filed: Feb. 6, 2007

(86) PCT No.: PCT/IL2007/000153
§ 371 (c)(1),
(2), (4) Date: Jul. 29, 2008

(87) PCT Pub. No.: WO2007/091251
PCT Pub. Date: Aug. 16, 2007

(65) Prior Publication Data
US 2009/0021689 A1  Jan. 22, 2009

(30) Foreign Application Priority Data
Feb. 7, 2006  (IL) .......................................... 173595

(51) Int. Cl.
*G02C 7/06* (2006.01)
(52) U.S. Cl. ........................... 351/54; 351/115; 351/131
(58) Field of Classification Search .................... 351/41, 351/54, 55, 110, 44, 111–123, 124–135
See application file for complete search history.

(56) References Cited

U.S. PATENT DOCUMENTS

| 772,196 | A | * | 10/1904 | Ward | 351/54 |
| 1,381,603 | A | | 6/1921 | Updegrave | |
| 2,285,615 | A | | 6/1942 | Ruchser | |
| 2,285,616 | A | | 6/1942 | Ruchser | |
| D208,502 | S | * | 9/1967 | Halpern et al. | D16/314 |
| 3,526,449 | A | * | 9/1970 | Bolle et al. | 351/41 |
| 4,787,731 | A | | 11/1988 | Rogers | |
| 5,004,334 | A | | 4/1991 | Miele | |
| 5,784,142 | A | * | 7/1998 | Mao | 351/119 |
| 7,222,957 | B1 | * | 5/2007 | Allred | 351/54 |
| 2004/0130674 | A1 | | 7/2004 | Epstein | |

FOREIGN PATENT DOCUMENTS

FR    270362 A1   9/1994
GB    206311 A    11/1923

* cited by examiner

*Primary Examiner* — Huy K Mai
(74) *Attorney, Agent, or Firm* — Naomi Assia Law Offices & Co.

(57) ABSTRACT

The present invention discloses glasses comprising an invertible nose bridge and invertible temples. The glasses can be worn in two manners by rotating the glasses 180 degrees in the plane of the lens or lenses. The lenses are asymmetrical along an axis which is drawn through the nose bridge. The invention additionally discloses an invertible nose bridge characterized in that it comprises two recesses into which the nose fits.

8 Claims, 5 Drawing Sheets

INVERTIBLE EYEWEAR

FIELD OF THE INVENTION

Figure 1:
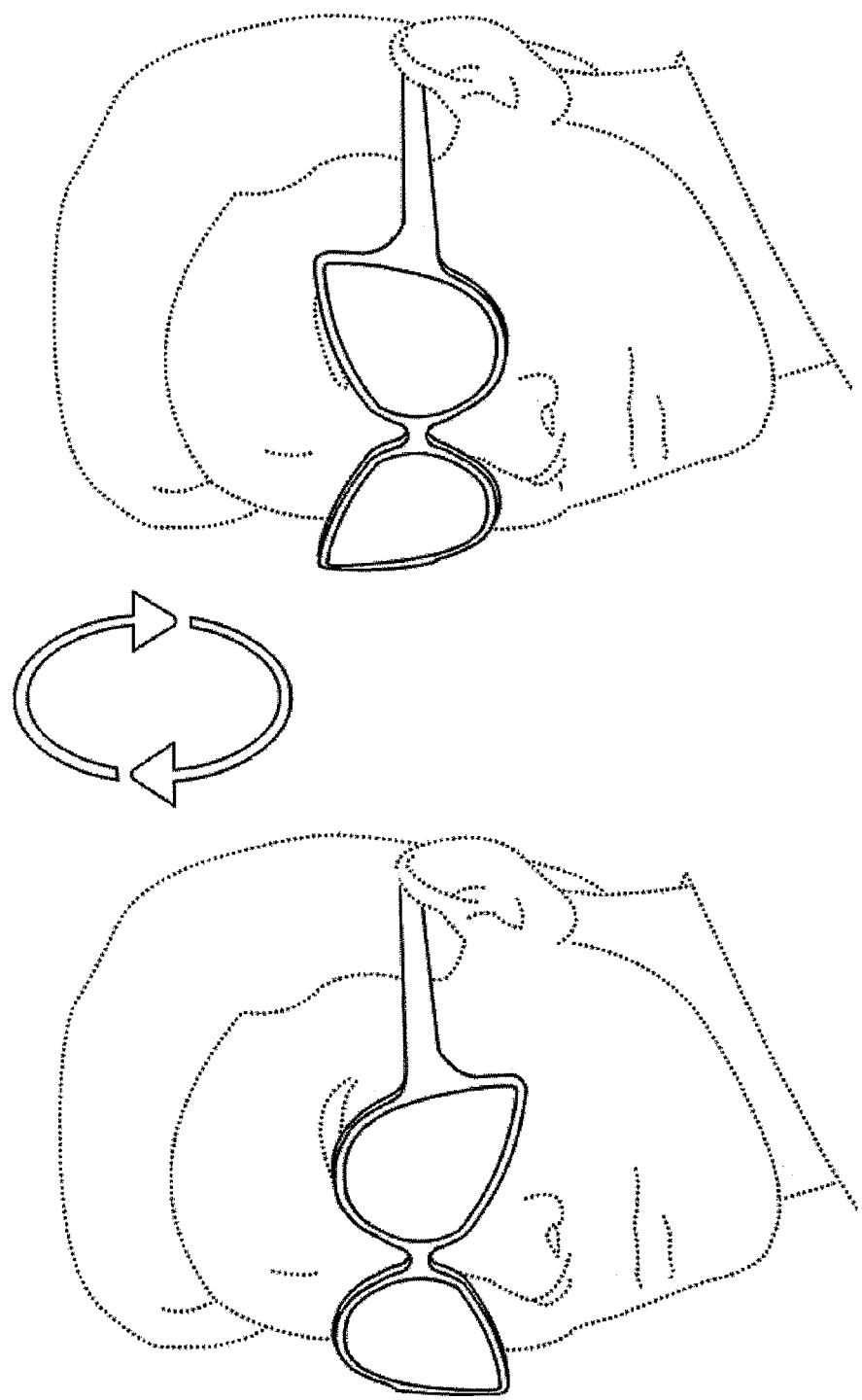

The present invention relates to the field of eye wear and eye glasses, particularly to invertible eyeglasses.

BACKGROUND OF THE INVENTION

The field of eye wear fashion has developed extremely over the years and today has become one of the leading fields in fashion accessories. Accordingly, wearers of glasses seek to change the appearance of their glasses according to their fashion preferences. However, currently the only known way of changing the appearance of a pair of glasses is offered by commercial products which provide a number of sets of lenses which fit the same frame and are of different color. In most cases the different sets of lenses are rather similar in shape in order to fit into the frame and hence the change in appearance for the wearer of the glasses is primarily merely a change of color. In order to change the appearance of the shape of the glasses the wearer needs to change the glasses, thus having to own several pairs of glasses. In the present context and throughout the specification the terms "eye glasses", "eye wear" and "glasses" are synonymous and encompasses all types of spectacles including sunglasses, prescription glasses, protective eye wear and the like. U.S. Pat. No. 772,196 to Ward, describes bifocal eyeglasses wherein the lenses can be revolved in the frame such that the vision segments may be varied in positioning in the filed of sight. For this purpose the lenses as described therein are symmetric. FR 2703162 describes reversible spectacles which are intended for corrective lenses and as such describe perfectly circular symmetric lenses. Hence all the lenses of the prior art glasses are symmetrical, such that when the glasses are inverted the appearance of the glasses on the face is the same in both positions.

In view of the above-mentioned limitation, there is a need for glasses which provide more than one appearance and offer an apparent change in shape.

It is therefore an objective of the present invention to provide glasses which can be worn in more than one fashion and offer an apparent change in style and shape.

It is a further objective of the present invention to provide a novel nose bridge which can be used in constructing said glasses.

Other objectives of the invention shall become apparent as the description proceeds.

SUMMARY OF THE INVENTION

The present invention provides glasses comprising an invertible nose bridge and invertible temples as described herein, wherein said glasses can be worn in two manners by rotating the glasses 180 degrees in the plane of the lens or lenses and wherein said lenses are asymmetrical a long an axis which is drawn through the nose bridge.

According to a further aspect of the present invention there is provided an invertible nose bridge for glasses characterized in that it comprises two recesses into which the nose fits.

BRIEF DESCRIPTIONS OF THE DRAWING

Figure 2:
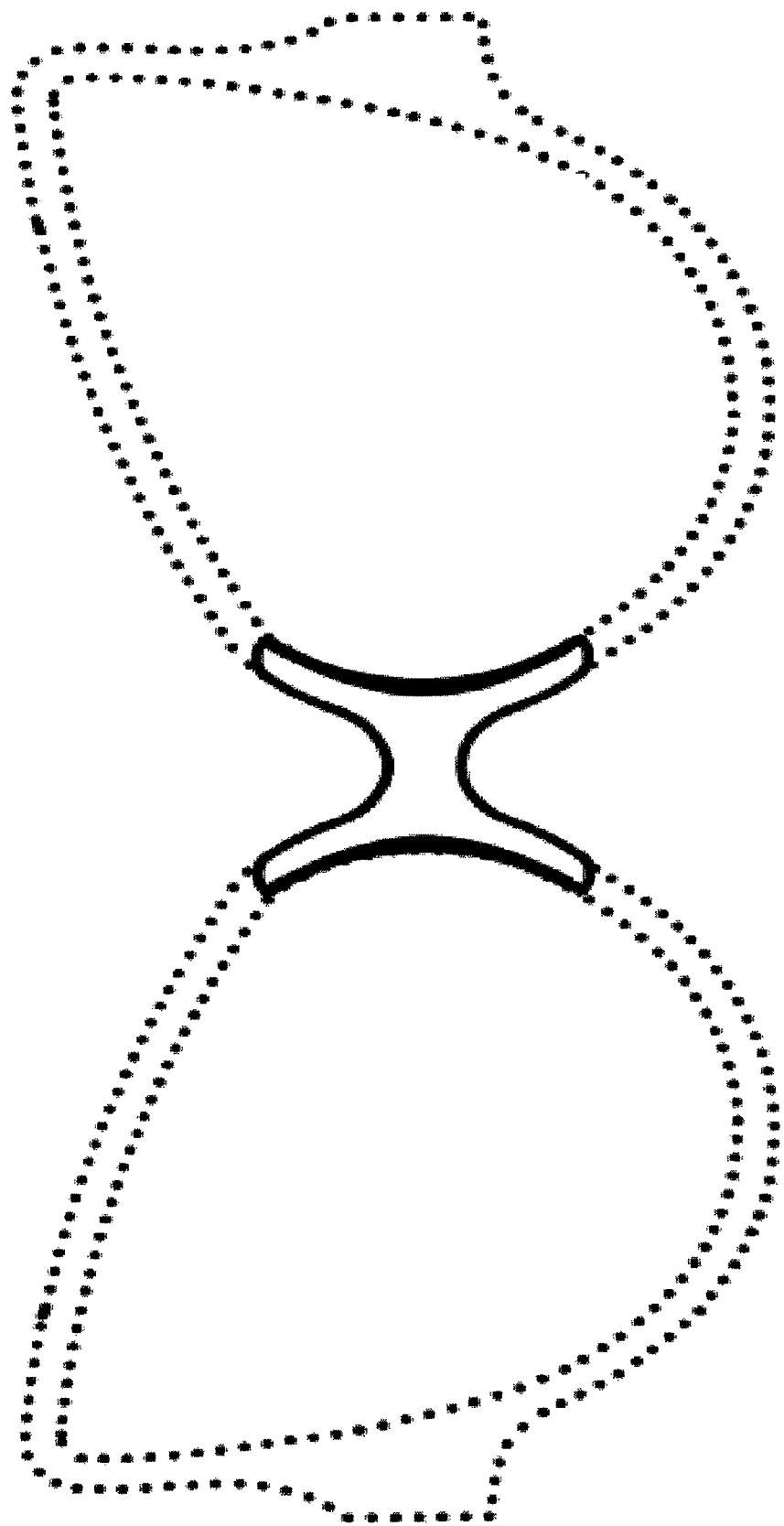
Figure 3:
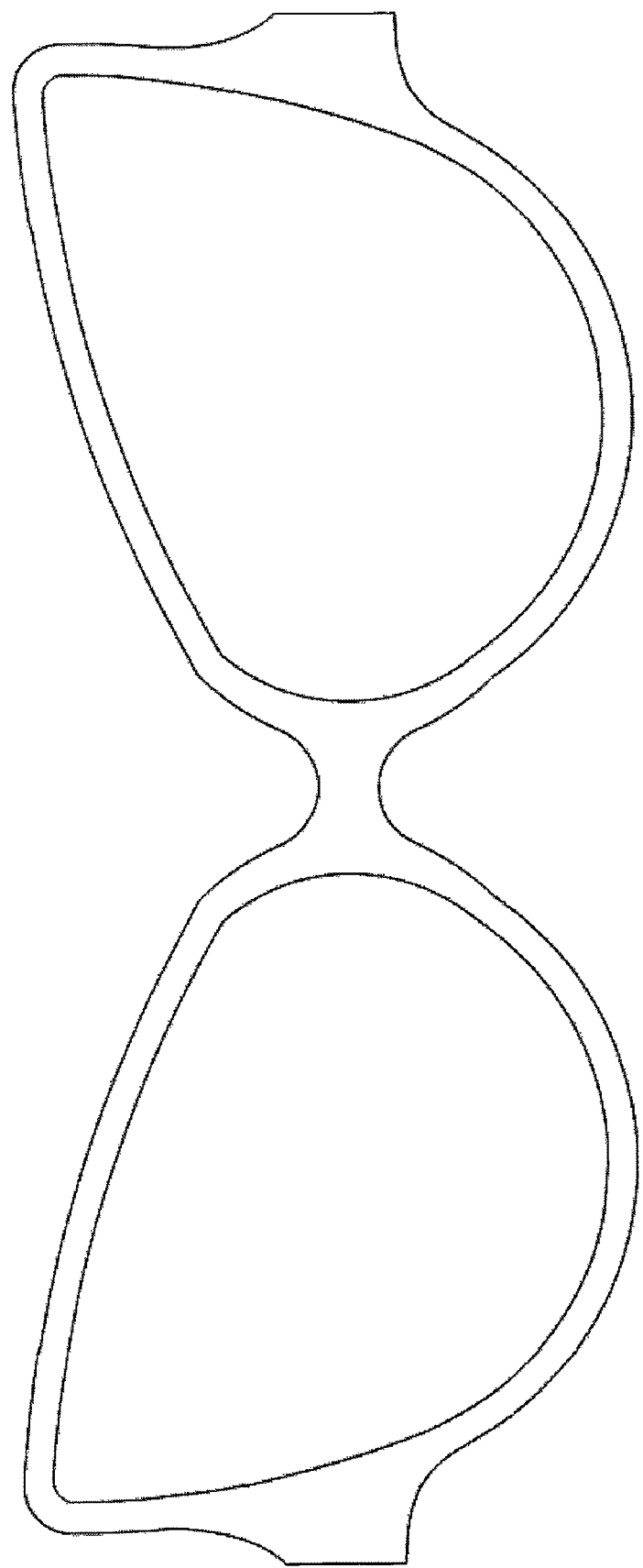
Figure 4:
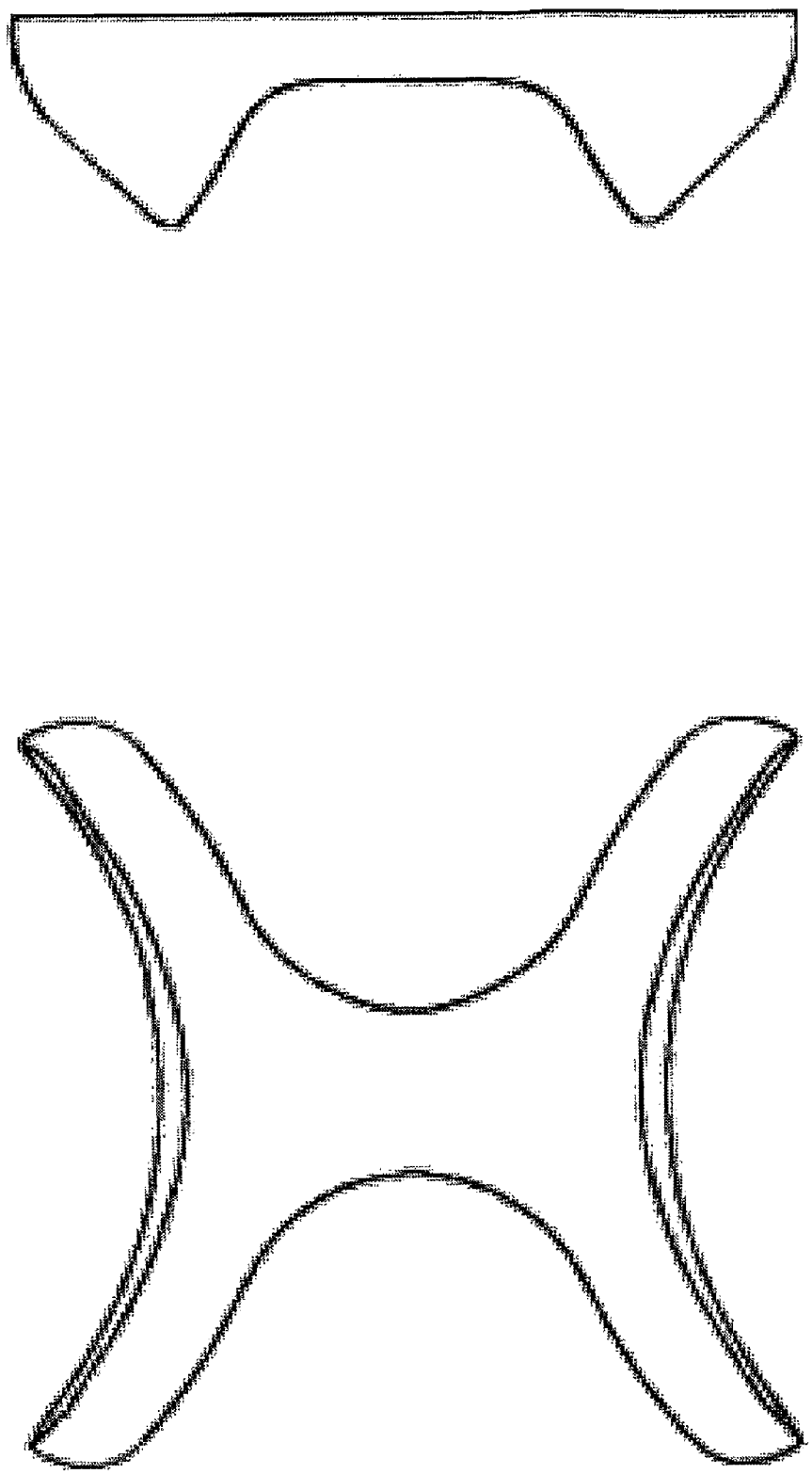
Figure 5:
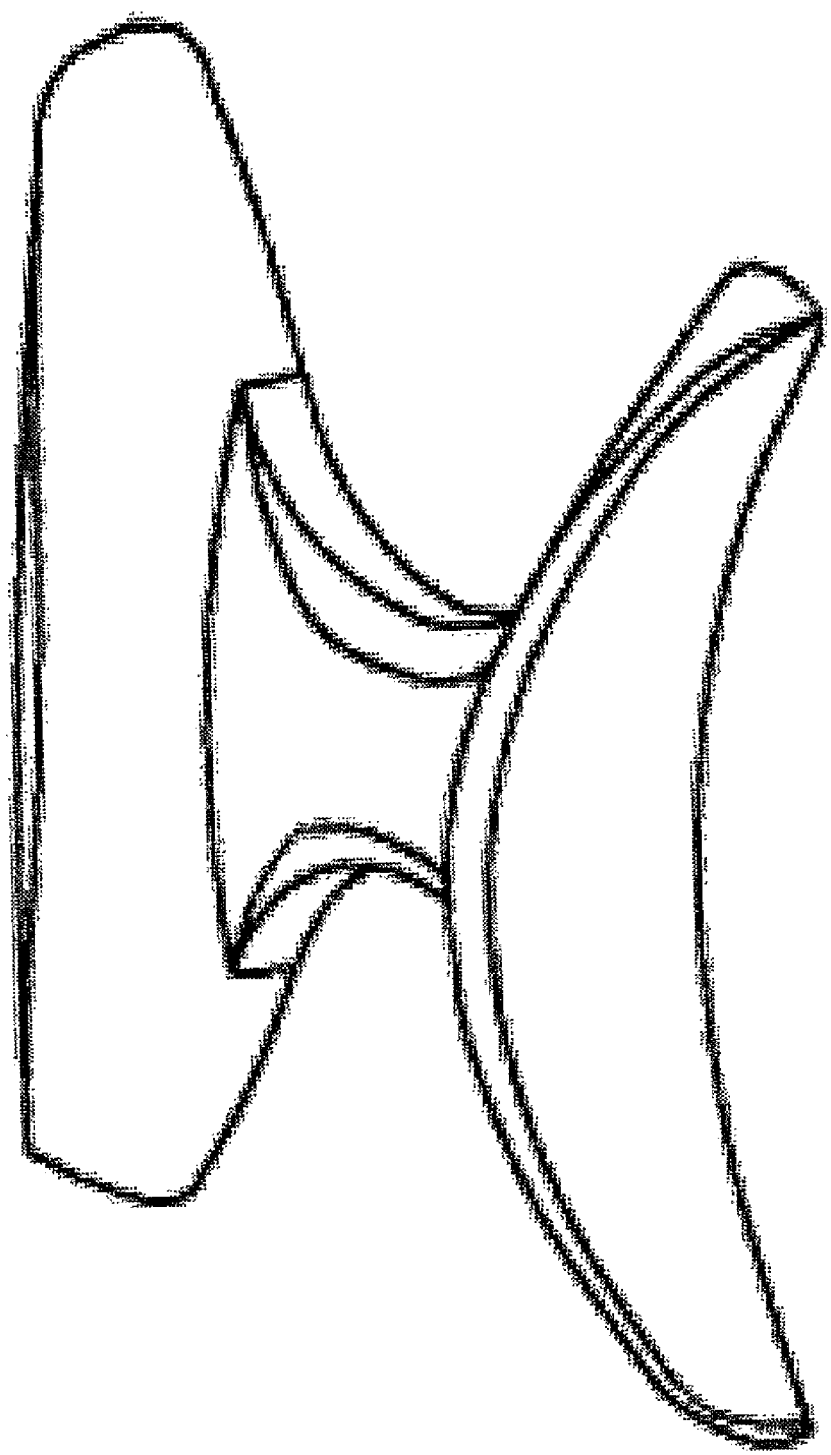

FIG. 1—A front view of the glasses in inverted and regular wearing position.
FIG. 2—A front view of the glasses emphasizing the nose-bridge.
FIG. 3—A front view of the glasses.
FIG. 4—A Front and top view of the nose bridge.
FIG. 5—A perspective view of the nose bridge.

DETAILED DESCRIPTION OF PREFERRED EMBODIMENTS

The following description is illustrative of embodiments of the invention with reference to the Figures. The following description is not to be construed as limiting, it being understood that the skilled person may carry out many obvious variations to the invention.

In accordance with a particular aspect of the present invention, there is provided glasses comprising an invertible nose bridge (FIGS. 2,4 and 5) and invertible temples as described herein, wherein said glasses can be worn in two manners by rotating the glasses 180 degrees in the plane of the lens or lenses (FIG. 1). According to a particular embodiment of the present invention, said temples and nose bridge are directly mounted onto the lenses wherein the lenses can be selected from a wide range of shapes, colors and types. Non-limiting examples being tinted lenses, safety lenses, round, oval square and irregularly shaped lenses and prescription lenses. The lenses are further characterized in that said lenses are asymmetrical a long an axis which is drawn through the nose bridge. Hence when the glasses are inverted the manner in which the lenses are positioned on the face is different so as to provide a different appearance (FIG. 1).

Further provided by the present invention is an invertible nose bridge for glasses characterized in that it comprises two recesses into which the nose fits (FIGS. 2 and 4). Said nose bridge enables to wear glasses which are fitted with this type of nose bridge in two fashions. The second fashion is by merely rotating the glasses 180 degrees in the plane of the lens. FIG. 1 illustrates said two fashions, wherein the second fashion was created by rotating the glasses 180 degrees in the plane of the lenses.

According to a specific preferred embodiment of the present invention, said nose bridge further comprises mounting fittings for at least one lens). It is further within the scope of the present invention to provide glasses wherein the lense is a single lense covering both eyes, also known as a visor, wherein said nose bridge is an integral part of said visor.

According to a specific embodiment of the invention said nose bridge is constructed of two vertical members connected by a horizontal member wherein said vertical members can be curved to match the shape of the lens which is mounted thereto. According to a certain embodiment wherein round or oval shaped lenses are employed, the shape of said nose bridge is constructed in a curved letter-H-shape (FIGS. 2 & 4). The shape of the lenses can be selected from a wide range of shapes and the scope of the present invention is not limited by the shape of the lenses.

According to a particular preferred embodiment of the present invention, said nose bridge is connected directly to the lenses and is an integral part of the frame of the glasses.

According to a further embodiment of the invention, said nose bridge may be part of a frame of the glasses, in which case said nose bridge may be mounted onto the frame which is fitted with the lenses.

The foregoing described nose bridge may be constructed of any suitable material as anticipated by the skilled artisan. Non-limiting examples of suitable materials are metals, metal alloys, polymers, polymer composites and combinations thereof.

According to a further embodiment of the invention said nose bridge and temples are mounted to a frame.

In all of the above embodiments the lenses and/or frames are not limited to any particular shape or style. Said shape or style may be selected based on fashion preferences and functionality.

While embodiments of the invention have been described by way of illustration, it will be apparent that the invention may be carried out with many modifications, variations and adaptations, without departing from its spirit or exceeding the scope of the claims.

It should be understood that some modification, alteration and substitution is anticipated and expected from those skilled in the art without departing from the teachings of the invention. Accordingly, it is appropriate that the following claims be construed broadly and in a manner consistent with the scope and spirit of the invention.

The invention claimed is:

1. Glasses comprising:
   one or more lenses;
   an invertible nose bridge; and
   invertible temples,
   wherein said glasses can be worn two ways by rotating the glasses 180 degrees in the plane of the one or more lenses and wherein the outer perimeter of each of said one or more lenses is asymmetrical.

2. Glasses according to claim 1 wherein said nose bridge is an integral part of a frame supporting the lenses.

3. Glasses according to claim 1 wherein said nose bridge and temples are mounted directly to the lenses.

4. Glasses according to claim 1 wherein said nose bridge and temples are mounted to a frame supporting the lenses.

5. A method of reorienting glasses on the wearer to provide a different appearance of the glasses, the method comprising:
   providing one or more lenses with an invertible nose bridge and invertible temples to thereby constitute the glasses; and
   rotating the glasses 180 degrees in the plane of the one or more lenses;
   wherein the outer perimeter of each of said one or more lenses is asymmetrical.

6. The method according to claim 5, wherein the invertible nose bridge is an integral part of a frame supporting the one or more lenses.

7. The method according to claim 5, wherein the invertible nose bridge and the invertible temples are mounted directly to the one or more lenses.

8. The method according to claim 5, wherein the invertible nose bridge and the invertible temples are mounted to a frame supporting the one or more lenses.

\* \* \* \* \*